United States Patent
Li (10) Patent No.: US 12,137,416 B2
(45) Date of Patent: Nov. 5, 2024

(54) DOWNLINK CHANNEL MONITORING METHOD, TERMINAL, BASE STATION AND STORAGE MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 189 days.

(21) Appl. No.: 17/311,318

(22) PCT Filed: Dec. 5, 2018

(86) PCT No.: PCT/CN2018/119424
§ 371 (c)(1),
(2) Date: Jun. 4, 2021

(87) PCT Pub. No.: WO2020/113480
PCT Pub. Date: Jun. 11, 2020

(65) Prior Publication Data
US 2022/0022134 A1   Jan. 20, 2022

(51) Int. Cl.
*H04W 52/02* (2009.01)

(52) U.S. Cl.
CPC ... *H04W 52/0229* (2013.01); *H04W 52/0219* (2013.01)

(58) Field of Classification Search
CPC .......... H04W 52/0229; H04W 52/0212; Y02D 30/70
See application file for complete search history.

(56) References Cited

U.S. PATENT DOCUMENTS

| | | | |
|---|---|---|---|
| 2017/0171759 A1 | 6/2017 | Li et al. | |
| 2020/0107266 A1* | 4/2020 | Liao | H04W 52/0229 |
| 2020/0112919 A1* | 4/2020 | Nam | H04B 7/0617 |
| 2020/0186319 A1* | 6/2020 | Liao | H04L 5/0098 |

FOREIGN PATENT DOCUMENTS

| | | |
|---|---|---|
| CN | 1581753 A | 2/2005 |
| CN | 102547585 A | 7/2012 |
| CN | 102595567 A | 7/2012 |
| WO | 2015111323 A1 | 7/2015 |
| WO | 2016119281 A1 | 8/2016 |

(Continued)

OTHER PUBLICATIONS

International Search Report issued in PCT/CN2018/119424, dated Sep. 4, 2019 with English translation, (4p).

(Continued)

*Primary Examiner* — Omer S Mian
(74) *Attorney, Agent, or Firm* — Arch & Lake LLP (57) ABSTRACT

A method, device, and a storage medium for downlink channel monitoring are provided. The method may be applied to a terminal. The terminal may receive a control signal, and acquire the target cell range of the control signal. The target cell range may be used for determining a target cell made effective by the control signal. The terminal may determine a target downlink channel of the target cell according to the target cell range. The terminal may monitor the target downlink channel according to the control signal.

13 Claims, 5 Drawing Sheets

(56) References Cited

FOREIGN PATENT DOCUMENTS

WO    2018127217 A1    7/2018
WO    2018171730 A1    9/2018

OTHER PUBLICATIONS

First Chinese Office Action issued to Chinese Application No. 201880002358.4 dated 31, 2020 with English translation, (16p).
Qualcomm Incorporated, "Open Issues on CA", Discussion and Decision, 3GPP TSG RAN WG1 Meeting #91, R1-1720694, Reno, Nevada, Nov. 27-Dec. 1, 2017, (14p).
Qualcomm Incorporated, "Triggering Adaptation of UE Power Consumption Characteristics," 3GPP TSG-RAN WG1 Meeting #95, R1-1813448, Nov. 12-16, 2018, Spokane, Washington, US, (17p).
Qualcomm Incorporated, "Views on UE power saving," 3GPP TSG RAN WG1 Meeting #94, R1-1809462, Gothenburg, Sweden, Aug. 20-24, 2018, (11p).

* cited by examiner

DOWNLINK CHANNEL MONITORING METHOD, TERMINAL, BASE STATION AND STORAGE MEDIUM

CROSS-REFERENCE TO RELATED APPLICATION

The present application is the U.S. national phase of PCT Application No. PCT/CN2018/119424, filed on Dec. 5, 2018, the content of which is incorporated hereby in its entirety for all purposes.

TECHNICAL FIELD

The present disclosure relates to the field of communication technology, and specifically relates to a downlink channel monitoring method, terminal, base station, and storage medium.

BACKGROUND

In a communication system, a base station usually sends instructions to a terminal through a downlink channel, and the terminal monitors the downlink channel to receive instructions transmitted by the downlink channel. Considering that continuous monitoring of the downlink channel will consume excessive power, a monitoring method is currently proposed, which can monitor the downlink channel according to the control signal.

The terminal is configured with a monitoring time period and a non-monitoring time period. The terminal monitors the downlink channel during the monitoring time period, and enters a sleep state during the non-monitoring time period and stops monitoring the downlink channel. In addition, the base station may send a control signal which includes a wake-up signal or a sleep signal to the terminal through the downlink channel, and control the terminal to monitor the downlink channel through the control signal. When the terminal monitors the wake-up signal, it is determined to monitor the downlink channel in the next monitoring time period, and when the terminal does not monitor the wake-up signal, it will no longer monitor the downlink channel in the next monitoring time period. When the terminal monitors the sleep signal, it enters the sleep state, stops monitoring the downlink channel, and it stops sleeping when the duration of the sleep state reaches a preset duration.

In a carrier aggregation scenario, the terminal is configured with a plurality of downlink channels. A control signal is received through each downlink channel, and the corresponding downlink channel is monitored according to the received control signal, which will consume excessive communication resources and excessive power.

SUMMARY

The present disclosure provides a downlink channel monitoring method, terminal, base station, and storage medium, which can solve related technical problems. The technical solution is as follows.

According to a first aspect of the present disclosure, there is provided a method for downlink channel monitoring, which is applied to a terminal, and the method includes receiving a control signal, and acquiring a target cell range of the control signal. The target cell range is used to determine a target cell for which the control signal takes effect. The method further includes determining a target downlink channel of the target cell according to the target cell range. The method also includes monitoring the target downlink channel according to the control signal.

According to a second aspect of the present disclosure, there is provided a method for downlink channel monitoring, applied to a base station, and the method includes configuring a target cell range for a terminal. The target cell range is used to determine a target cell for which a control signal takes effect. The method further includes sending the control signal to the terminal. The terminal is configured to determine a target downlink channel of the target cell according to the target cell range, and monitor the target downlink channel according to the control signal.

According to a third aspect of the present disclosure, there is provided a device. The device may include one or more processors, a non-transitory computer-readable memory storing instructions executable by the one or more processors. The one or more processors may be configured to receive a control signal. The one or more processors may further be configured to acquire a target cell range of the control signal. The target cell range is used to determine a target cell for which the control signal takes effect. The one or more processors may further be configured to determine a target downlink channel of the target cell according to the target cell range. The one or more processors may further be configured to monitor the target downlink channel according to the control signal.

BRIEF DESCRIPTION OF THE DRAWINGS

The drawings herein are incorporated into the specification and constitute a part of the specification, show embodiments in accordance with the disclosure, and together with the specification are used to explain the principle of the disclosure.

DETAILED DESCRIPTION

In order to make the objectives, technical solutions, and advantages of the present disclosure clearer, the present disclosure will be further described in detail with reference to the embodiments and the drawings in the following. Herein, the exemplary embodiments of the present disclosure and the description thereof are used to explain the present disclosure, but not as a limitation to the present disclosure.

The embodiments of the present disclosure provide a downlink channel monitoring method, terminal, base station, and storage medium. The present disclosure will be described in detail below with reference to the accompanying drawings.

Figure 1:
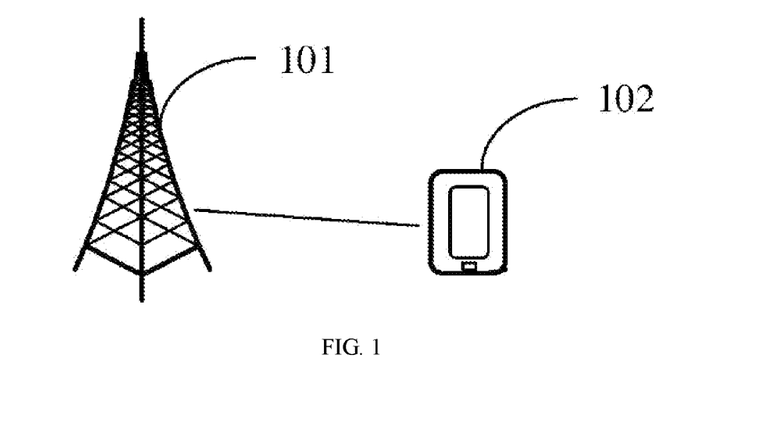
FIG. 1 is a schematic structural diagram showing a communication system according to an exemplary embodiment.

FIG. 1 is a schematic structural diagram of a communication system according to an exemplary embodiment. As shown in FIG. 1, the communication system includes a base station 101 and a terminal 102. The base station 101 and the terminal 102 are connected through a communication network.

In the communication process, a downlink channel and an uplink channel are configured between the base station 101 and the terminal 102. The base station 101 can send signals or instructions to the terminal 102 through a downlink channel, and the terminal 102 can send signals or instructions to the base station 101 through a uplink channel, thus realizing the interaction between the base station 101 and the terminal 102.

In order to meet requirements of single-user peak rate and system capacity improvement, a carrier aggregation scenario is currently proposed. In the carrier aggregation scenario, the base station 101 is configured with a plurality of cells, including Pcell (Primary Cell) and Scell (Secondary Cell). Each cell includes at least one uplink channel and at least one downlink channel. Then the base station 101 can send signals or instructions to the terminal 102 through a plurality of downlink channels, and the terminal 102 can send signals or instructions to the base station 101 through a plurality of uplink channels, thereby realizing the interaction between the base station 101 and the terminal 102.

In order to monitor the instructions sent by the base station 101 in time, the terminal 102 may monitor one or more downlink channels, and thereby monitor the instructions sent through the downlink channel. The downlink channel may be a PDCCH (Physical Downlink Control Channel) channel of the cell or other types of channels. The instruction may be a PDCCH authorization instruction, a scheduling instruction, or a control instruction, or other instructions. Moreover, in order to save power, the terminal 102 does not monitor the downlink channel in real time, but monitors the downlink channel according to the control signal sent by the base station 101 to reduce power consumption. Compared with frequent monitoring, this manner saves more power.

Figure 2:
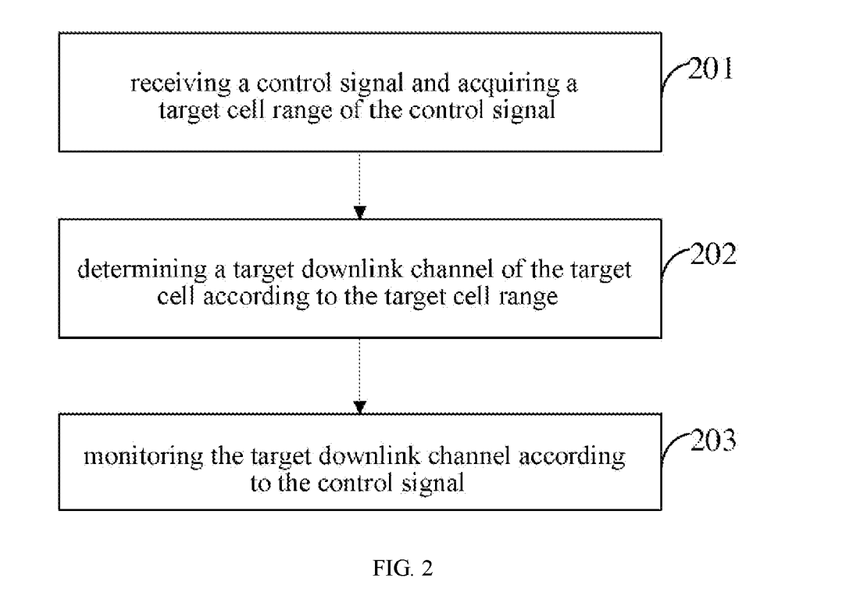
FIG. 2 is a flow chart showing a method for monitoring a downlink channel according to an exemplary embodiment.

FIG. 2 is a flow chart showing a method for monitoring a downlink channel according to an exemplary embodiment, which is applied to a terminal. As shown in FIG. 2, the method includes following steps.

In step 201, a control signal is received, and a target cell range of the control signal is acquired. The target cell range is used to determine a target cell for which the control signal takes effect.

In step 202, a target downlink channel of the target cell is determined according to the target cell range.

In step 203, the target downlink channel is monitored according to the control signal.

Through the method provided by embodiments of the present disclosure, a control signal is received, and the target cell range of the control signal is acquired, a target downlink channel of the target cell for which the control signal takes effect is determined according to the target cell range, and the target downlink channel is monitored according to the control signal. Provided by an embodiment of the present disclosure is a manner for monitoring a target downlink channel made effective by a control signal, wherein the control signal need not be separately transmitted to a terminal for each target downlink channel, the target cell for which the control signal takes effect and the cell for which the control signal is invalid can be distinguished, and then the target downlink channel for which the control signal takes effect is determined, thereby saving communication resources and power.

In a possible implementation, the receiving a control signal includes:
receiving the control signal sent through a main downlink channel; or,
receiving the control signal sent through a secondary downlink channel.

In a possible implementation, the acquiring a target cell range of the control signal includes:
acquiring a stored target cell range, wherein the target cell range is sent by a base station or determined by an agreement between the terminal and the base station; or,
acquiring a target cell range carried in the control signal.

In a possible implementation, the control signal includes a target cell field, wherein the target cell field includes an indication identifier of each cell, and the indication identifier is used to indicate whether the control signal takes effect.

In a possible implementation, the acquiring a target cell range of the control signal includes:
acquiring a first index identifier carried by the control signal;
querying a first index table according to the first index identifier, and acquiring a target cell range corresponding to the first index identifier.

In a possible implementation, the method further includes:
acquiring a target channel range of the control signal, wherein the target channel range is used to determine a target downlink channel for which the control signal takes effect;
the determining a target downlink channel of the target cell according to the target cell range includes:
determining the target downlink channel of the target cell according to the target cell range and the target channel range.

In a possible implementation, the acquiring a target channel range of the control signal includes:
acquiring a stored target channel range, wherein the target channel range is sent by a base station or determined by an agreement between the terminal and the base station; or,
acquiring the target channel range carried in the control signal.

In a possible implementation, the control signal includes a target channel field, wherein the target channel field includes an indication identifier of each downlink channel, and the indication identifier is used to indicate whether the control signal takes effect.

In a possible implementation, the acquiring a target channel range of the control signal includes:
acquiring a second index identifier carried by the control signal;
querying a second index table according to the second index identifier, and acquiring a target channel range corresponding to the second index identifier.

Figure 3:
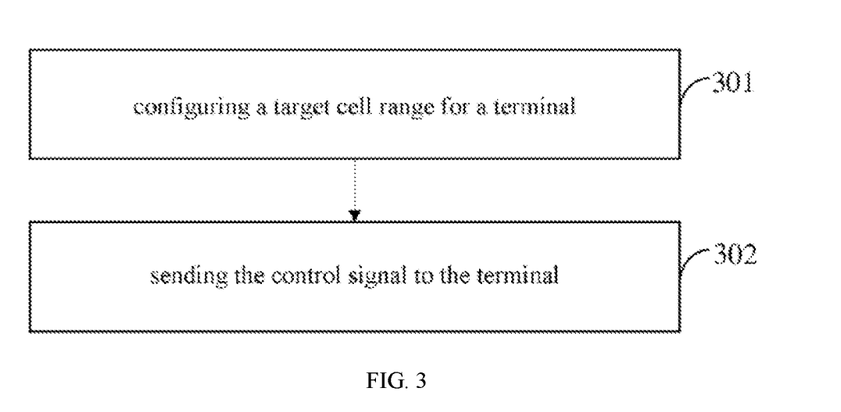
FIG. 3 is a flow chart showing a method for monitoring a downlink channel according to an exemplary embodiment.

FIG. 3 is a flow chart showing a method for monitoring a downlink channel according to an exemplary embodiment, which is applied to a base station. As shown in FIG. 3, the method includes following steps.

In step 301, a target cell range is configured for a terminal, wherein the target cell range is used to determine a target cell for which a control signal takes effect.

In step 302, the control signal is sent to the terminal.

The terminal is configured to determine a target downlink channel of the target cell according to the target cell range, and monitor the target downlink channel according to the control signal.

Through the method provided by embodiments of the present disclosure, a target cell range is configured for a terminal, a control signal is sent to the terminal, such that the terminal can receive the control signal, acquire the target cell range of the control signal, determine the target downlink channel of the target cell, and monitor the target downlink channel according to the control signal. Provided by an embodiment of the present disclosure is a manner for monitoring a target downlink channel made effective by a control signal, wherein the control signal need not be separately transmitted to a terminal for each target downlink channel to determine the target downlink channel made effective by the control signal, thereby saving communication resources and power.

In a possible implementation, the configuring a target cell range for a terminal includes:

sending the target cell range to the terminal; or, adding a first index identifier to the control signal, wherein the terminal is configured to query a first index table according to the first index identifier, to determine the target cell range corresponding to the first index identifier; or, adding the target cell range to the control signal.

In a possible implementation, the adding the target cell range in the control signal includes:

adding a target cell field to the control signal, wherein the target cell field includes an indication identifier of each cell, and the indication identifier is used to indicate whether the control signal takes effect.

In a possible implementation, the method further includes:

configuring a target channel range for the terminal, wherein the target channel range is used to determine a target downlink channel for which the control signal takes effect, wherein the terminal is further configured to determine the target downlink channel of the target cell according to the target cell range and the target channel range.

In a possible implementation, the configuring a target channel range for the terminal includes:

sending the target channel range to the terminal; or, adding a second index identifier to the control signal, wherein the terminal is configured to query a second index table according to the second index identifier, to determine the target channel range corresponding to the second index identifier; or, adding the target channel range to the control signal.

In a possible implementation, the adding the target cell range to the control signal includes:

adding a target channel field to the control signal, wherein the target cell field includes an indication identifier of each downlink channel, and the indication identifier is used to indicate whether the control signal takes effect.

Figure 4:
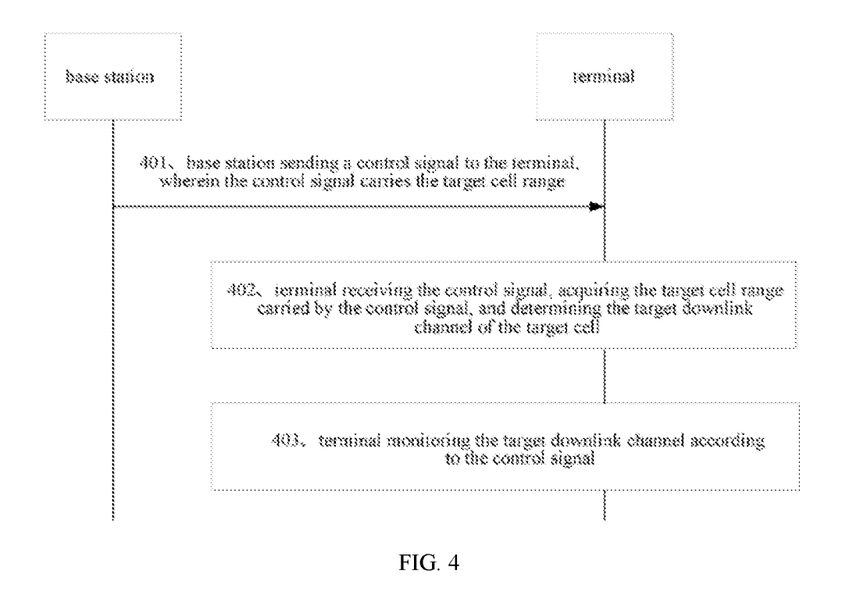
FIG. 4 is a flow chart showing a method for monitoring a downlink channel according to an exemplary embodiment.

FIG. 4 is a flow chart showing a method for monitoring a downlink channel according to an exemplary embodiment. The subjects of interaction in this embodiment are the base station and the terminal. The manner of determining the target cell for which the control signal takes effect according to the target cell range is illustrated, for example, as shown in FIG. 4, it includes following steps.

In step 401, the base station sends a control signal to the terminal, wherein the control signal carries the target cell range.

In the embodiments of the present disclosure, the base station is provided with a plurality of cells, and each cell includes at least one downlink channel, so that the base station and the terminal can communicate through a plurality of downlink channels.

For each downlink channel, the base station sends instructions to the terminal through the downlink channel, and the terminal monitors the downlink channel and detects the instructions sent by the base station through the downlink channel. In addition, the base station may send a control signal to the terminal, and the terminal receives the control signal, and monitors the downlink channel according to the control signal.

In one possible implementation, the control signal is a wake-up signal, and the terminal is configured with a monitoring rule for monitoring the wake-up signal. The monitoring rule includes the monitoring cycle, the start time point and duration of the monitoring time period in the monitoring cycle, and the start time point and duration of the non-monitoring time period in the monitoring cycle.

The start time point of the monitoring time period in the monitoring cycle may be expressed by an offset of the starting time point relative to the starting time point of the monitoring time point.

Then the base station sends a wake-up signal to the terminal, and the terminal will monitor the downlink channel in the next monitoring time period only when it monitors the wake-up signal, and will not monitor the downlink channel in the next monitoring time period if it does not monitor the wake-up signal. In addition, during the non-monitoring time period, the terminal will enter the sleep state and no longer monitor the downlink channel.

In another possible implementation manner, the control signal is a sleep signal, and the terminal is configured with a monitoring rule for monitoring the sleep signal, and the monitoring rule includes the start time point of entering the sleep state and the duration of the sleep state. The starting time point of entering the sleep state may be the moment when the terminal monitors the sleep signal, or the moment when a certain preset event occurs after the sleep signal is detected, or may also be other moments.

Then the base station sends a sleep signal to the terminal, and when the terminal monitors the sleep signal, it sleeps according to the start time point of entering the sleep state and the duration of the sleep state.

It should be noted that the base station and the terminal can negotiate to determine the above two monitoring rules. For example, the base station can send the foregoing two monitoring rules to the terminal through high-level signaling, MAC CE (Media Access Control Control Element) signaling, physical layer signaling or other singling. Alternatively, the base station may not send the foregoing two monitoring rules to the terminal through signaling, but set the foregoing two monitoring rules in the transmission protocol.

In the embodiment of the present disclosure, considering that it will consume excessive communication resources and power of the terminal if the control signal for each downlink channel is sent separately, therefore, by setting the target cell range, the target cell for which the control signal takes effect is determined, thereby determining the downlink channel for which the signal takes effect and the downlink channel for which the signal is invalid.

First, the base station sends a control signal to the terminal through the downlink channel, and the terminal receives the control signal through the downlink channel.

In a possible implementation, the base station configures a main downlink channel and at least one secondary downlink channel for the terminal, then the base station can send the control signal through the main downlink channel, and the terminal receives the control signal sent through the main downlink channel. Alternatively, the base station may send the control signal through the secondary downlink channel, and the terminal receives the control signal sent through the secondary downlink channel.

In step 402, the terminal receives the control signal, acquires the target cell range carried by the control signal, and determines the target downlink channel of the target cell.

When the base station sends a control signal to the terminal, the target cell range is added to the control signal. The target cell range is used to determine at least one target cell for which the control signal takes effect. Then the terminal receives the control signal and can acquire the target cell range of the control signal from the control signal, determine at least one target cell for which the control signal takes effect, distinguish the target cell for which the control signal takes effect from other cells, and then determine the downlink channel of the target cell as the target downlink channel for which the control signal takes effect, and determine the downlink channels of other cells as downlink channels for which control signal is invalid.

The manners for the terminal to acquire the target cell range carried by the control signal include but not limited to following two manners.

In the first manner, the base station adds the target cell range to the control signal, and the transmitted control signal carries the target cell range, and the terminal can directly acquire the target cell range of the control signal from the control signal.

In a possible implementation, the target cell range is expressed in the form of a target cell field. The base station adds a target cell field to the control signal. The target cell field includes an indication identifier of each cell, and the indication identifier is used to indicate whether the control signal takes effect. When receiving the control signal, the terminal acquires the target cell field of the control signal, and determines the target cell for which the control signal takes effect according to the indication identifier of each cell in the target cell field.

The target cell field may include a plurality of bits, which respectively indicate the indication identifiers of a plurality of cells. When the indication identifier is the first identifier, it means that the corresponding cell is the target cell for which the control signal takes effect, and when the indication identifier is the second identifier, it means that the corresponding cell is the cell for which the control signal is invalid.

For example, the first bit in the target cell field is the indication identifier of Pcell, the second bit is the indication identifier of Scell 1, and the third bit is the indication identifier of Scell 2. The indication identifier being 1 means that the corresponding cell is a target cell for which the control signal takes effect, and the indication identifier being 0 means that the corresponding cell is a cell for which the control signal is invalid.

In the second manner, the base station adds the first index identifier to the control signal. When the terminal receives the control signal, it acquires the first index identifier carried by the control signal, and queries the first index table according to the first index identifier to acquire the target cell range corresponding to the first index identifier.

The base station may create a first index table according to one or more possible target cell ranges, send it to the terminal, and the terminal stores the first index table. Alternatively, the terminal may determine the first index table according to the agreement with the base station. In the embodiment, the first index table includes a target cell range corresponding to each first index identifier, different first index identifiers correspond to different target cell ranges, and each target cell range may include at least one target cell. Then the base station only needs to send the first index identifier to the terminal, to determine the corresponding target cell range, thereby determining the target cell for which the control signal takes effect according to the target cell range. In this way, there is no need for the base station to send the target cell range itself to the terminal, which saves communication resources and accelerates the communication speed.

In the embodiment, the target cell range includes the cell identifier of the target cell for which the control signal takes effect. The cell identifier is used to determine a unique cell, and may be a cell serial number, a cell name, and so on. The target cell range may include the cell identifiers of all cells to which the terminal belongs, or the cell identifiers of some cells. In addition, the target cell range may include the cell identifier of the Pcell and at least one Scell, which indicates that the control signal is applicable to a plurality of target cells including the Pcell. Alternatively, the cell identifier of the Pcell may not be included in the target cell range, indicating that the control signal is applicable to all or part of the Scell, but not applicable to the Pcell.

For example, the first index table may be as shown in Table 1 below. If the first index identifier is 1, the corresponding target cell range includes Pcell.

TABLE 1

| first index identifier | target cell range |
|---|---|
| 1 | Pcell |
| 2 | Pcell, Scell 1 |
| 3 | Pcell, Scell 1, Scell 2 |

In a possible implementation manner, the base station may send the first index table to the terminal through a plurality of manners such as high-level signaling or physical layer signaling.

In addition, the base station may create a first index table for all terminals and send it to each terminal, and subsequently each terminal may monitor according to the stored first index table. Alternatively, the base station can also create a first index table for each terminal separately according to the cell to which each terminal belongs, and send the first index table of each terminal to the corresponding terminal respectively, and subsequently each terminal may monitor according to the respectively stored first index table. In the first index table of different terminals, the target cell range may be the same or different.

It should be noted that the embodiments of the present disclosure are only described by taking the control signal carrying the target cell range as an example. In another embodiment, when the base station configures the target cell range for the terminal, other manners may also be used for configuration.

For example, the base station acquires the target cell range of the control signal, sends the target cell range to the terminal, and the terminal stores the target cell range. When the base station sends the target cell range, it can be sent through a broadcast message or dedicated signaling. Alternatively, the terminal determines the target cell range according to the agreement with the base station, without requiring the base station to send the target cell range.

Alternatively, the base station may send the updated target cell range to the terminal when creating a new downlink channel for the terminal, and the target cell range sent by the base station when creating different downlink channels may be the same or different.

Alternatively, the base station configures a plurality of types of control signals for the terminal, and different types of control signals may include different type identifiers, or different scrambling manners are adopted. Each time the base station creates a new downlink channel for the terminal, it sends the type of control signal through the downlink channel, instructing the terminal to monitor the downlink channel according to the control signal of the corresponding type. The terminal adds the cell identifier of the downlink channel to the target cell range corresponding to the type of the control signal. When the control signal is received, the target cell range corresponding to the type of the control signal is determined, thereby determining the target cell for which the control signal takes effect.

In step 403, the terminal monitors the target downlink channel according to the control signal.

In one possible implementation, the control signal is a wake-up signal. The terminal monitors the wake-up signal of any one or more downlink channels. When the wake-up signal is monitored, as for the target downlink channel, the wake-up signal takes effect, and then the target downlink channel is monitored in the next monitoring time period. As for other downlink channels except for the target downlink channel, the wake-up signal is invalid, and the terminal will not monitor the other downlink channels in the next monitoring time period.

In addition, when the terminal does not monitor the wake-up signal, it will not monitor the downlink channel in the next monitoring time period. During the non-monitoring time period, the terminal will enter the sleep state and no longer monitor the downlink channel.

In the embodiments of the present disclosure, by setting the target cell range, a single wake-up signal is used to control the terminal to monitor all cells or some cells in the next monitoring time period. The operation is simple, simplifies the interaction between the base station and the terminal, and saves communication resources.

In another possible implementation, the control signal is a sleep signal, and the terminal monitors the sleep signal of any one or more downlink channels. When the sleep signal is monitored, as for the target downlink channel, the sleep signal takes effect, and then the terminal sleeps according to the start time point of entering the sleep state and the duration of the sleep state. As for other downlink channels except for the target downlink channel, the sleep signal is invalid, and the terminal will not sleep according to the starting time point of entering the sleep state and the duration of the sleep state. In addition, during the non-monitoring time period, the terminal will enter the sleep state and no longer monitor the downlink channel.

In the embodiments of the present disclosure, by setting the target cell range, a single sleep signal is used to control all cells or some cells to sleep, which is easy to operate, simplifies the interaction between the base station and the terminal, and saves communication resources.

It should be noted that the same monitoring rules can be set for different downlink channels, and then the monitoring cycle, the start time point and duration of the monitoring time period in the monitoring cycle, and the start time point and the duration of the non-monitoring time period in the monitoring cycle are the same. The terminal can monitor according to the set monitoring rules. Alternatively, different monitoring rules can be set for different downlink channels, and then the terminal can monitor the target downlink channel according to the monitoring rule of the target downlink channel. Alternatively, when the terminal sends a control signal through a certain downlink channel, the terminal can monitor the target downlink channel according to the monitoring rule of the downlink channel that sends the control signal. Alternatively, the terminal may also monitor the target downlink channel according to the monitoring rule of the main downlink channel, or may also determine the monitoring rule when monitoring the target downlink channel in other ways.

Through the method provided by embodiments of the present disclosure, a control signal is received, and the target cell range of the control signal is acquired, a target downlink channel of the target cell for which the control signal takes effect is determined according to the target cell range, and the target downlink channel is monitored according to the control signal. Provided by an embodiment of the present disclosure is a manner for monitoring a target downlink channel made effective by a control signal, wherein the control signal need not be separately transmitted to a terminal for each target downlink channel to determine the target downlink channel made effective by the control signal, thereby saving communication resources and power.

In addition, the terminal firstly acquires the first index table, and each time the base station sends a control signal, the first index identifier is carried in the control signal, without carrying the target cell range itself The terminal queries the first index table according to the first index identifier to determine the corresponding target cell rang. Since the amount of data identified by the first index is less than the amount of data of the target cell range, the manner of carrying the first index identifier reduces the amount of data, saves communication resources, and accelerates the communication speed.

The embodiments of the present disclosure can also be applied to a dual-connection scenario. The control signal can be applied to each cell group in the dual-connection scenario. At this time, the Pcell can be the Pcell of the primary cell group or the Pscell of the secondary cell group (the primary cell of the secondary cell group), except for the Pcell or Pscell, other cells are S cells. Alternatively, the control signal may be applicable to all cell groups in the dual-connection scenario. At this time, the Pcell may be the Pcell of the primary cell group, and except for the Pcell, other cells are Scells.

Figure 5:
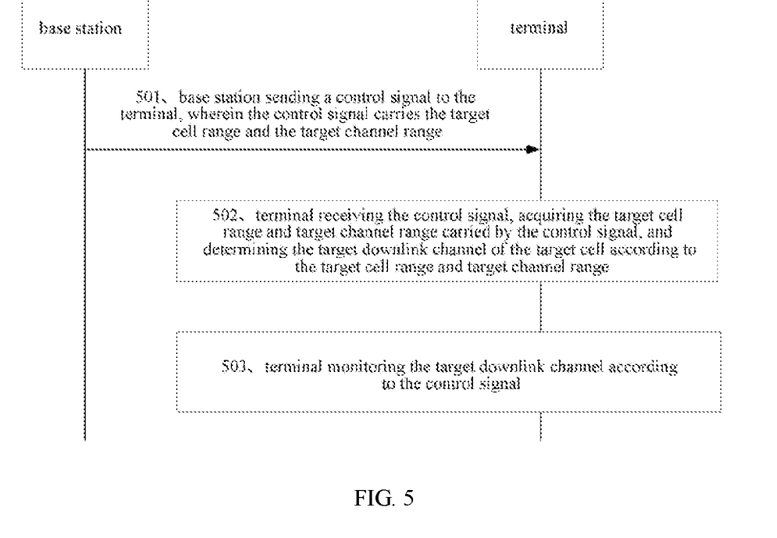
FIG. 5 is a flow chart showing another method for monitoring a downlink channel according to an exemplary embodiment.

On the basis of the above embodiment shown in FIG. 4, a downlink channel monitoring method is also provided. FIG. 5 is a flow chart of a method for monitoring a downlink channel according to an exemplary embodiment. The subjects of interaction in this embodiment are the base station and the terminal. The manner of determining the target cell for which the control signal takes effect according to the target cell range and the target channel range is illustrated, as shown in FIG. 5, it includes the following steps.

In step 501, the base station sends a control signal to the terminal, wherein the control signal carries the target cell range and the target channel range.

In the embodiment of the present disclosure, considering that it will consume excessive communication resources and power if the control signal for each downlink channel is sent separately, therefore, by setting the target cell range, the target cell for which the control signal takes effect is determined. Furthermore, considering that a cell may include a plurality of downlink channels, in order to achieve more fine-grained division, by setting the target channel range, the target downlink channel of the target cell for which the control signal takes effect is determined.

First, the base station sends a control signal to the terminal through the downlink channel, and the terminal receives the control signal through the downlink channel.

In a possible implementation, the base station configures a plurality of downlink channels for the terminal, and can send the control signal through any one of the downlink channels. The downlink channel can be the subsequently determined target downlink channel for which the control signal takes effect, or the downlink channel for which the control signal is invalid. For example, the base station may send a control signal through a default BWP (BandWidth Part), an initial BWP, a default BWP, or some other BWPs.

In step 502, the terminal receives the control signal, acquires the target cell range and target channel range carried by the control signal, and determines the target downlink channel of the target cell according to the target cell range and target channel range.

When the base station sends a control signal to the terminal, the target cell range and the target channel range are added to the control signal. The target cell range is used to determine the target cell for which the control signal takes effect, and the target channel range is used to determine the target downlink channel of the target cell. The terminal receives the control signal, the target cell range and the target channel range of the control signal are acquired from the control signal, the target cell for which the control signal takes effect and the target downlink channel of the target cell are determined, and the target downlink channel for which the control signal takes effect is distinguished from other downlink channels.

The manner in which the terminal acquires the target cell range carried by the control signal is similar to the embodiment shown in FIG. 4, which will not be repeated herein.

The manner for the terminal to acquire the target channel range carried by the control signal includes but not limited to following two manners.

In the first manner, the base station adds the target channel range to the control signal, and the sent control signal carries the target channel range, and the terminal can directly acquire the target channel range of the control signal from the control signal.

In a possible implementation, the target channel range is expressed in the form of a target channel field. The base station adds a target channel field to the control signal. The target channel field includes the indication identifier of each downlink channel, and the indication identifier is used to indicate whether the control signal takes effect. When receiving the control signal, the terminal acquires the target channel field of the control signal, and determines the target downlink channel for which the control signal takes effect according to the indicator identifier of each downlink channel in the target channel field.

The target channel field may include a plurality of bits, which respectively represent the indication identifiers of a plurality of downlink channels. When the indicator identifier is the first identifier, it indicates that the corresponding downlink channel is the target downlink channel for which the control signal takes effect, and when the indicator identifier is the second identifier, it indicates that the corresponding downlink channel is a downlink channel for which the control signal is invalid.

For example, the first bit in the target downlink channel field is the indication identifier of the initial BWP, the second bit is the indication identifier of the default BWP, and the third bit is the indication identifier of some other BWP. The indication identifier being 1 indicates that the corresponding downlink channel is the target downlink channel for which the control signal takes effect, and the indication identifier being 0 indicates that the corresponding downlink channel is the downlink channel for which the control signal is invalid.

In the second manner, the base station adds a second index identifier to the control signal. When the terminal receives the control signal, it acquires the second index identifier carried by the control signal, and queries the second index table according to the second index identifier to acquire the target channel range corresponding to the second index identifier.

The base station may create a second index table according to one or more possible target channel ranges, send it to the terminal, and the terminal stores the second index table. Alternatively, the terminal may determine the second index table according to the agreement with the base station. In the embodiment, the second index table includes a target channel range corresponding to each second index identifier. Different second index identifiers correspond to different target channel ranges, and each target channel range may include at least one target downlink channel. Then the base station only needs to send the second index identifier to the terminal to determine the corresponding target channel range, thereby determining the target downlink channel for which the control signal takes effect according to the target channel range. In this way, there is no need for the base station to send the target channel range itself to the terminal, which saves communication resources and accelerates the communication speed.

In the embodiment, the target channel range may include the channel identifier of the target downlink channel for which the control signal takes effect. The channel identifier is used to determine the corresponding downlink channel, and may be the BWP to which the downlink channel belongs, the frequency band where the downlink channel is located, and so on. The target channel range may include the channel identifiers of all the downlink channels of the terminal, or the channel identifiers of a part of the downlink channels, and may include all the downlink channels of the target cell, or a part of the downlink channels of the target cell. In addition, the target channel range may include the channel identifier of the downlink channel of the Pcell and at least one Scell, indicating that the control signal is applicable to a plurality of target downlink channels including the downlink channel of the Pcell. Alternatively, the target channel range may not include the channel identifier of the downlink channel of the Pcell, indicating that the control signal is applicable to the downlink channel of all or a part of the Scells, but not applicable to the downlink channel of the Pcell.

For example, the second index table may be as shown in Table 2 below. If the second index identifier is 1, the corresponding target channel range includes BWP1.

TABLE 2

| second index identifier | target channel range |
|---|---|
| 1 | BWP1 |
| 2 | BWP1, BWP2 |
| 3 | BWP1, BWP2, BWP3 |

In a possible implementation manner, the base station may send the second index table to the terminal through a plurality of manners such as high-level signaling or physical layer signaling.

In addition, the base station may create a second index table for all terminals and send it to each terminal, and subsequently each terminal may monitor according to the stored second index table. Alternatively, the base station can also create a second index table for each terminal separately according to the downlink channel configured by each terminal, and send the second index table of each terminal to the corresponding terminal respectively, and subsequently each terminal may monitor according to the respectively stored second index table. In the second index tables of different terminals, the target channel range may be the same or different.

It should be noted that the embodiments of the present disclosure are only described by taking the control signal carrying the target channel range as an example. In another embodiment, when the base station configures the target channel range for the terminal, other manners may also be used for configuration.

For example, the base station acquires the target channel range, sends the target channel range to the terminal, and the terminal stores the target channel range. When the base station sends the target channel range, it can be sent through a broadcast message or dedicated signaling. Alternatively, the terminal determines the target channel range according to the agreement with the base station, without requiring the base station to send the target channel range.

Alternatively, the base station may send the updated target channel range to the terminal when creating a new downlink channel for the terminal. The target channel range sent by the base station when creating different downlink channels may be the same or different.

Alternatively, the base station configures a plurality of types of control signals for the terminal, and different types of control signals may include different type identifiers, or different scrambling manners are adopted. Each time the base station creates a new downlink channel for the terminal, it sends the type of control signal through the downlink channel, instructing the terminal to monitor the downlink channel according to the control signal of the corresponding type. The terminal adds the downlink channel to the target channel range corresponding to the type of the control signal. When the control signal is received, the target channel range corresponding to the type of the control signal is determined, thereby determining the target downlink channel for which the control signal takes effect.

In step 503, the terminal monitors the target downlink channel according to the control signal.

Step 503 is similar to step 403 described above, which will not be repeated herein.

In the embodiments of the present disclosure, by setting the target channel range, a single wake-up signal is used to control the terminal to monitor all downlink channels or a part of the downlink channels of the target cell in the next monitoring time period. The operation is simple, simplifies the interaction between the base station and the terminal, and saves communication resources. Alternatively, a single sleep signal is used to control all downlink channels or a part of the downlink channels of the target cell to sleep or deactivate. The operation is simple, simplifies the interaction between the base station and the terminal, and saves communication resources.

For example, by sending a sleep signal, the base station can make the target cell fall back from the activated BWP to the default BWP or the initial BWP, and the control terminal no longer monitors the activated BWP, but monitors the default BWP or the initial BWP. Since the bandwidth of the default BWP or the initial BWP is smaller than that of other BWPs, it saves more power.

Through the method provided by embodiments of the present disclosure, by acquiring the target cell range and target channel range of the control signal, the target cell for which the control signal takes effect and the target downlink channel of the target cell are determined according to the target cell range and target channel range, and the target downlink channel is monitored according to the control signal. The embodiments of the present disclosure provide a manner for monitoring a target downlink channel made effective by a control signal, wherein the control signal need not be separately transmitted to a terminal for each target downlink channel, the target cell for which the control signal takes effect and the cell for which the control signal is invalid can be distinguished, and the target downlink channel for which the control signal takes effect and the downlink channel for which the control signal is invalid in the cell can be distinguished, and then the target downlink channel for which the control signal takes effect is determined. This not only saves communication resources and the power of the terminal, but also achieves a more fine-grained configuration, which better meets communication configuration requirements.

In addition, the terminal firstly acquires the second index table, and each time the base station sends a control signal, the second index identifier is carried in the control signal, without carrying the target channel range itself. The terminal queries the second index table according to the second index identifier to determine the corresponding target channel rang. Since the amount of data identified by the second index is less than the amount of data of the target channel range, the manner of carrying the second index identifier reduces the amount of data, saves communication resources, and accelerates the communication speed.

Figure 6:
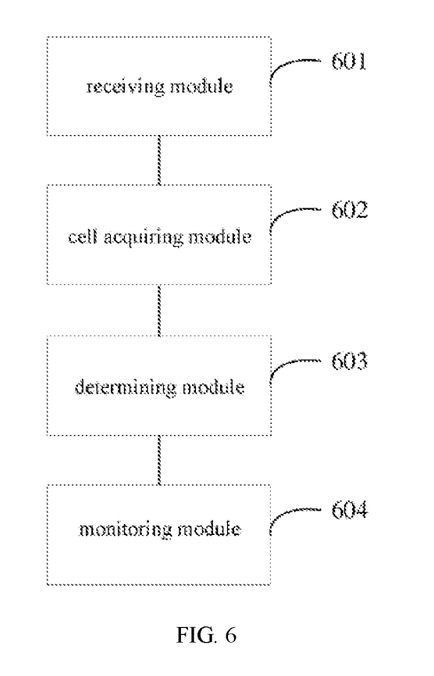
FIG. 6 is a block diagram showing a terminal according to an exemplary embodiment.

FIG. 6 is a block diagram showing a terminal according to an exemplary embodiment. As shown in FIG. 6, the terminal includes:

a receiving module 601, configured to receive a control signal;

a cell acquiring module 602, configured to acquire a target cell range of the control signal, wherein the target cell range is used to determine a target cell for which the control signal takes effect;

a determining module 603, configured to determine a target downlink channel of the target cell; and a monitoring module 604, configured to monitor the target downlink channel according to the control signal.

Through the terminal provided by embodiments of the present disclosure, a control signal is received, and the target cell range of the control signal is acquired, a target downlink channel of the target cell for which the control signal takes effect is determined according to the target cell range, and the target downlink channel is monitored according to the control signal. Provided by an embodiment of the present disclosure is a manner for monitoring a target downlink channel made effective by a control signal, wherein the control signal need not be separately transmitted to a terminal for each target downlink channel, the target cell for which the control signal takes effect and the cell for which the control signal is invalid can be distinguished, and then the target downlink channel for which the control signal takes effect is determined, thereby saving communication resources and power.

In a possible implementation, the receiving module 601 includes:

a first receiving unit, configured to receive the control signal sent through a main downlink channel;

a second receiving unit, configured to receive the control signal sent through a secondary downlink channel.

In a possible implementation, the cell acquiring module 602 includes:

a first cell acquiring unit, configured to acquire a stored target cell range, wherein the target cell range is sent by a base station or determined by an agreement between the terminal and the base station;

a second cell acquiring unit, configured to acquire a target cell range carried in the control signal.

In a possible implementation, the control signal includes a target cell field, wherein the target cell field includes an indication identifier of each cell, and the indication identifier is used to indicate whether the control signal takes effect.

In a possible implementation, the cell acquiring module 602 includes:

a third cell acquiring unit, configured to acquire a first index identifier carried by the control signal; query a first index table according to the first index identifier, and acquire a target cell range corresponding to the first index identifier.

In a possible implementation, the apparatus further includes:

a channel acquiring module, configured to acquire a target channel range of the control signal, wherein the target channel range is used to determine a target downlink channel for which the control signal takes effect;

wherein the determining module 603 is further configured to determine the target downlink channel of the target cell according to the target cell range and the target channel range.

In a possible implementation, the channel acquiring module includes:

a first channel acquiring unit, configured to acquire a stored target channel range, wherein the target channel range is sent by a base station or determined by an agreement between the terminal and the base station;

a second channel acquiring unit, configured to acquire the target channel range carried in the control signal.

In a possible implementation, the control signal includes a target channel field, wherein the target channel field includes an indication identifier of each downlink channel, and the indication identifier is used to indicate whether the control signal takes effect.

In a possible implementation, the channel acquiring module includes:

a third channel acquiring unit, configured to acquire a second index identifier carried by the control signal; query a second index table according to the second index identifier, and acquire a target channel range corresponding to the second index identifier.

Figure 7:
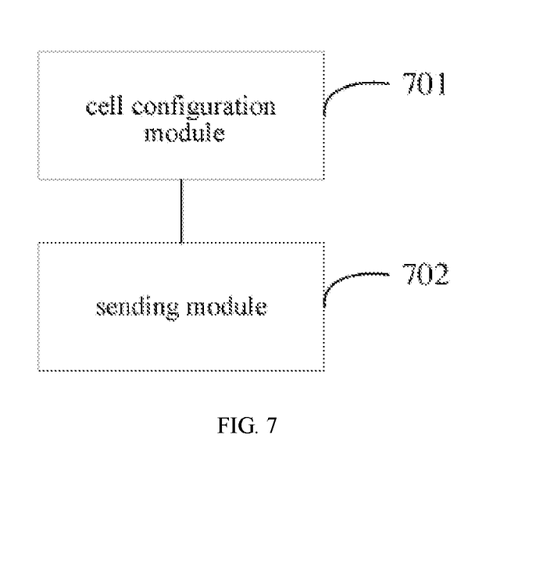
FIG. 7 is a block diagram showing a base station according to an exemplary embodiment.

FIG. 7 is a block diagram showing a base station according to an exemplary embodiment. As shown in FIG. 7, the base station includes:

a cell configuration module 701, used to configure a target cell range for a terminal, wherein the target cell range is used to determine a target cell for which a control signal takes effect;

a sending module 702, configured to send the control signal to the terminal;

wherein the terminal is configured to determine a target downlink channel of the target cell according to the target cell range, and monitor the target downlink channel according to the control signal.

Through the base station provided by embodiments of the present disclosure, a target cell range is configured for a terminal, a control signal is sent to the terminal, such that the terminal can receive the control signal, acquire the target cell range of the control signal, determine the target downlink channel of the target cell, and monitor the target downlink channel according to the control signal. Provided by an embodiment of the present disclosure is a manner for monitoring a target downlink channel made effective by a control signal, wherein the control signal need not be separately transmitted to a terminal for each target downlink channel to determine the target downlink channel made effective by the control signal, thereby saving communication resources and power.

In a possible implementation, the cell configuration module 701 includes:

a sending unit, configured to send the target cell range to the terminal;

a first adding unit, configured to add a first index identifier to the control signal, wherein the terminal is configured to query a first index table according to the first index identifier, to determine the target cell range corresponding to the first index identifier;

a second adding unit, configured to add the target cell range to the control signal.

In a possible implementation, the second adding unit is further configured to add a target cell field to the control signal, wherein the target cell field includes an indication identifier of each cell, and the indication identifier is used to indicate whether the control signal takes effect.

In a possible implementation, the base station further includes:

a channel configuration module, used to configure a target channel range for the terminal, wherein the target channel range is used to determine a target downlink channel for which the control signal takes effect, wherein the terminal is further configured to determine the target downlink channel of the target cell according to the target cell range and the target channel range.

In a possible implementation, the channel configuration module includes:

a sending unit, configured to send the target channel range to the terminal; or a third adding unit, configured to add a second index identifier to the control signal, wherein the terminal is configured to query a second index table according to the second index identifier, to determine the target channel range corresponding to the second index identifier; or, a fourth adding unit, configured to add the target channel range to the control signal.

In a possible implementation, the fourth adding unit is further configured to add a target channel field to the control signal, wherein the target cell field includes an indication identifier of each downlink channel, and the indication identifier is used to indicate whether the control signal takes effect.

It should be noted that when the terminal and base station provided in the above embodiment control and monitor the downlink channel, only the division of the above functional modules is used as an example. In practical applications, the above functions can be completed by different functional modules according to needs. That is, the internal structure of the terminal and the base station is divided into different functional modules to complete all or part of the functions described above. In addition, the terminal embodiment and the base station embodiment provided in the foregoing embodiments belong to the same concept as the downlink channel monitoring method embodiment. For the specific implementation process, please refer to the method embodiment, which will not be repeated herein.

Through the downlink channel monitoring method, terminal, base station and storage medium provided by embodiments of the present disclosure, a control signal is received, and the target cell range of the control signal is acquired, a target downlink channel of the target cell for which the control signal takes effect is determined according to the target cell range, and the target downlink channel is monitored according to the control signal. Provided by an embodiment of the present disclosure is a manner for monitoring a target downlink channel made effective by a control signal, wherein the control signal need not be separately transmitted to a terminal for each target downlink channel to determine the target downlink channel made effective by the control signal, thereby saving communication resources and power.

In addition, by acquiring the target cell range and target channel range of the control signal, the target cell for which the control signal takes effect and the target downlink channel of the target cell are determined according to the target cell range and target channel range, and the target downlink channel is monitored according to the control signal. The embodiments of the present disclosure provide a manner for monitoring a target downlink channel made effective by a control signal, wherein the control signal need not be separately transmitted to a terminal for each target downlink channel, the target cell for which the control signal takes effect and the cell for which the control signal is invalid can be distinguished, and the target downlink channel for which the control signal takes effect and the downlink channel for which the control signal is invalid in the cell can be distinguished, and then the target downlink channel for which the control signal takes effect is determined. This not only saves communication resources and the power of the terminal, but also achieves a more fine-grained configuration, which better meets communication configuration requirements.

Figure 8:
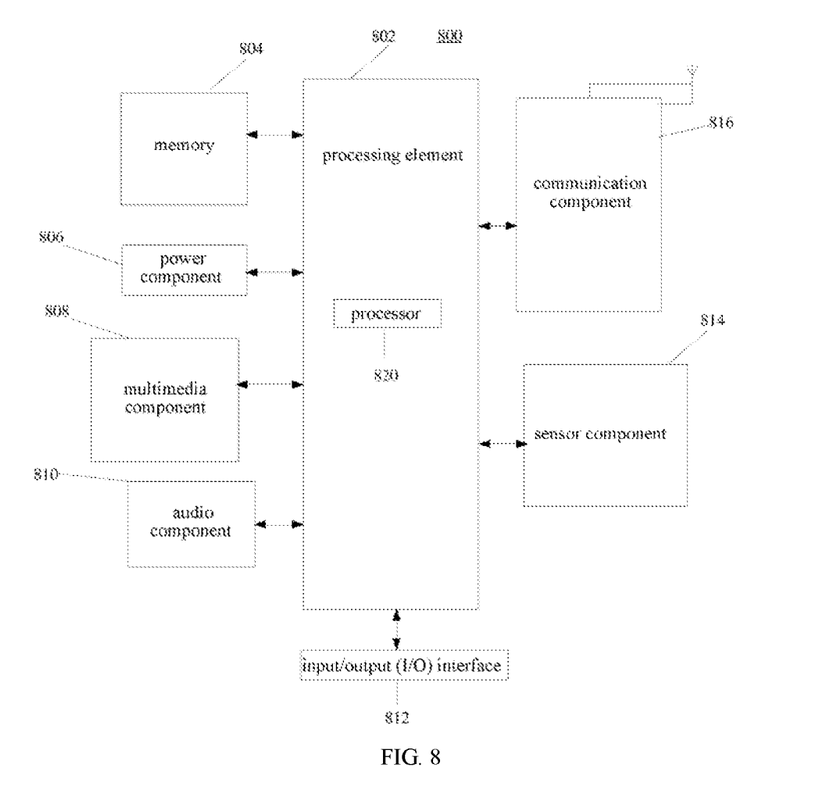
FIG. 8 is a block diagram showing a terminal according to an exemplary embodiment.

FIG. 8 is a block diagram showing a terminal 800 according to an exemplary embodiment. Referring to FIG. 8, for example, the terminal 800 may be a mobile phone, a computer, a digital broadcasting device, a messaging device, a game console, a tablet device, a medical device, a fitness device, a personal digital assistant, and the like.

Referring to FIG. 8, the terminal 800 may include one or more of the following components: a processing element 802, a memory 804, a power component 806, a multimedia component 808, an audio component 810, an input/output (I/O) interface 812, a sensor component 814, and a communication component 816.

The processing element 802 typically controls the overall operations of the terminal 800, such as the operations associated with display, telephone calls, data communications, camera operations, and recording operations. The processing element 802 can include one or more processors 820 to execute instructions to perform all or part of the steps in the above described methods. Moreover, the processing element 802 can include one or more modules to facilitate the interaction between the processing element 802 and other components. For example, the processing element 802 can include a multimedia module to facilitate the interaction between the multimedia component 808 and the processing element 802.

The memory 804 is configured to store various types of data to support the operation of the terminal 800. Examples of such data include instructions for any application or method operated on the terminal 800, such as the contact data, the phone book data, messages, pictures, videos, and the like. The memory 804 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 can include a power management system, one or more power sources, and other components associated with the generation, management, and distribution of power in the terminal 800.

The multimedia component 808 includes a screen providing an output interface between the terminal 800 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. When the terminal 800 is in an operation mode, such as a photographing mode or a video mode, the front camera and/or the rear camera can receive external multimedia data. Each of the front camera and the rear camera may be a fixed optical lens system or have focus and optical zoom capability.

The audio component 810 is configured to output and/or input an audio signal. For example, the audio component 810 includes a microphone (MIC) configured to receive an external audio signal when the terminal 800 is in an operation mode, such as a call mode, a recording mode, and a voice recognition mode. The received audio signal may be further stored in the memory 804 or sent via the communication component 816. In some embodiments, the audio component 810 also includes a speaker for outputting the audio signal.

The I/O interface 812 provides an interface between the processing element 802 and peripheral interface modules, such as a keyboard, a click wheel, buttons, and the like. These buttons may include, but not limited to, a home button, a volume button, a starting button, and a locking button.

The sensor component 814 includes one or more sensors for providing state assessments of various aspects of the terminal 800. For example, the sensor component 814 can detect an open/closed state of the terminal 800, relative positioning of components, such as the display and the keypad of the terminal 800. The sensor component 814 can also detect a change in position of one component of the terminal 800 or the terminal 800, the presence or absence of user contact with the terminal 800, an orientation, or an acceleration/deceleration of the terminal 800, and a change in temperature of the terminal 800. The sensor component 814 can also include a proximity sensor configured to detect the presence of nearby objects without any physical contact. The sensor component 814 can also include a light sensor, such as a CMOS or CCD image sensor, configured to use in imaging applications. In some embodiments, the sensor component 814 can also include an accelerometer sensor, a gyroscope sensor, a magnetic sensor, a pressure sensor, or a temperature sensor.

The communication component 816 is configured to facilitate wired or wireless communication between the terminal 800 and other devices. The terminal 800 can access a wireless network based on a communication standard, such as Wi-Fi, 2G, 3G or a combination thereof. In an exemplary embodiment, the communication component 816 receives broadcast signals or broadcast associated information from an external broadcast management system via a broadcast channel. In an exemplary embodiment, the communication component 816 also includes a near field communication (NFC) module to facilitate short-range communications.

In an exemplary embodiment, the terminal 800 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, to perform the above downlink channel monitoring methods.

In an exemplary embodiment, there is also provided a non-transitory computer-readable storage medium including instructions, such as a memory 804 including instructions executable by the processor 820 of the terminal 800 to perform the above methods. For example, the non-transitory computer readable storage medium may be a ROM, a random access memory (RAM), a CD-ROM, a magnetic tape, a floppy disc, and an optical data storage device, or the like.

Figure 9:
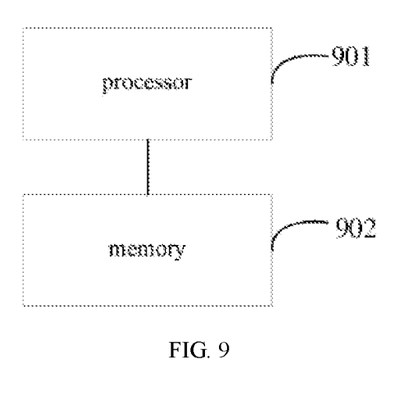
FIG. 9 is a block diagram showing a base station according to an exemplary embodiment.

FIG. 9 is a block diagram showing a base station according to an exemplary embodiment. Referring to FIG. 9, the base station includes a processor 901 and a memory 902 for storing instructions executable by the processor. The processor 901 is configured to:

configure a target cell range for a terminal, wherein the target cell range is used to determine a target cell for which a control signal takes effect;

send the control signal to the terminal;

wherein the terminal is configured to determine a target downlink channel of the target cell according to the target cell range, and monitor the target downlink channel according to the control signal.

A computer-readable storage medium is also provided. When the instructions in the computer-readable storage medium are executed by the processor of the base station, the base station can execute the method in the foregoing embodiment, and the method includes:

configuring a target cell range for a terminal, wherein the target cell range is used to determine a target cell for which a control signal takes effect;

sending the control signal to the terminal;

wherein the terminal is configured to determine a target downlink channel of the target cell according to the target cell range, and monitor the target downlink channel according to the control signal.

Those of ordinary skill in the art can understand that all or part of the steps in the above embodiments can be implemented by hardware, or by a program to instruct relevant hardware to complete. The program can be stored in a machine-readable storage medium. The storage medium can be read-only memory, magnetic disk or optical disk, or the like.

The above are only some optional embodiments of the embodiments of the present disclosure, and are not intended to limit the present disclosure. Any modification, equivalent replacement, improvement, etc. made within the spirit and principle of the embodiments of the present disclosure shall be included within the protection scope of embodiments in this disclosure.

What is claimed is:

1. A method for downlink channel monitoring, applied to a terminal, and the method comprising:

receiving a control signal sent through a secondary downlink channel from a base station, and acquiring a target cell range of the control signal, wherein the target cell range is configured to determine a target cell for which the control signal takes effect;

determining a target downlink channel of the target cell according to the target cell range; and monitoring the target downlink channel according to the control signal, wherein the control signal is a sleep signal, and the sleep signal is used to make the target cell fall back from an activated BandWidth Part to a default BandWidth Part or an initial BandWidth Part, where a bandwidth of the default BandWidth Part or the initial BandWidth Part is smaller than that of other BandWidth Parts, wherein monitoring the target downlink channel according to the control signal comprises:

stopping monitoring the activated BandWidth Part of the target cell, and monitoring the default BandWidth Part or the initial BandWidth Part of the target cell, wherein acquiring the target cell range of the control signal comprises:

acquiring a first index identifier carried by the control signal, wherein an amount of data of the first index identifier is less than an amount of data of the target cell range, querying a first index table according to the first index identifier; and acquiring a target cell range corresponding to the first index identifier.

2. The method according to claim 1, wherein acquiring the target cell range of the control signal comprises: acquiring a stored target cell range, wherein the target cell range is sent by the base station or determined by an agreement between the terminal and the base station; or acquiring a target cell range carried in the control signal.

3. The method according to claim 2, wherein the control signal comprises a target cell field, wherein the target cell field comprises an indication identifier of each cell, and the indication identifier is configured to indicate whether the control signal takes effect.

4. The method according to claim 1, wherein determining the target downlink channel of the target cell according to the target cell range comprises: acquiring a target channel range of the control signal, wherein the target channel range is configured to determine a target downlink channel for which the control signal takes effect; and determining the target downlink channel of the target cell according to the target cell range and the target channel range.

5. The method according to claim 4, wherein acquiring the target channel range of the control signal comprises: acquiring a stored target channel range, wherein the target channel range is sent by the base station or determined by an agreement between the terminal and the base station; or acquiring the target channel range carried in the control signal.

6. The method according to claim 5, wherein the control signal comprises a target channel field, wherein the target channel field comprises an indication identifier of each downlink channel, and the indication identifier is configured to indicate whether the control signal takes effect.

7. The method according to claim 4, wherein acquiring the target channel range of the control signal comprises: acquiring a second index identifier carried by the control signal; querying a second index table according to the second index identifier; and acquiring a target channel range corresponding to the second index identifier.

8. A method for downlink channel monitoring, applied to a base station, and comprising:
   configuring a target cell range for a terminal, wherein the target cell range is configured to determine a target cell for which a control signal takes effect; and
   sending the control signal to the terminal through a secondary downlink channel;
   wherein the terminal is configured to determine a target downlink channel of the target cell according to the target cell range, and monitor the target downlink channel according to the control signal, wherein the control signal is a sleep signal, and the sleep signal is used to make the target cell fall back from an activated BandWidth Part to a default BandWidth Part or an initial BandWidth Part, where a bandwidth of the default BandWidth Part or the initial BandWidth Part is smaller than that of other BandWidth Parts,
   wherein monitoring the target downlink channel according to the control signal comprises:
   stopping monitoring the activated BandWidth Part of the target cell, and monitoring the default BandWidth Part or the initial BandWidth Part of the target cell, wherein configuring the target cell range for a terminal comprises:
   sending the target cell range to the terminal; and
   adding a first index identifier to the control signal, wherein an amount of data of the first index identifier is less than an amount of data of the target cell range, the terminal is configured to query a first index table according to the first index identifier, to determine the target cell range corresponding to the first index identifier.

9. The method according to claim 8, wherein adding the target cell range in the control signal comprises:
   adding a target cell field to the control signal, wherein the target cell field comprises an indication identifier of each cell, and the indication identifier is configured to indicate whether the control signal takes effect.

10. The method according to claim 8, further comprising:
    configuring a target channel range for the terminal, wherein the target channel range is configured to determine a target downlink channel for which the control signal takes effect,
    wherein the terminal is configured to determine the target downlink channel of the target cell according to the target cell range and the target channel range.

11. The method according to claim 10, wherein adding the target channel range to the control signal comprises:
    adding a target channel field to the control signal, wherein the target cell field comprises an indication identifier of each downlink channel, and
    the indication identifier is configured to indicate whether the control signal takes effect.

12. A device comprising:
    one or more processors; and
    a non-transitory computer-readable storage medium for storing instructions executable by the one or more processors, wherein the one or more processors are configured to:
    receive a control signal sent through a secondary downlink channel from a base station, and acquire a target cell range of the control signal, wherein the target cell range is configured to determine a target cell for which the control signal takes effect;
    determine a target downlink channel of the target cell according to the target cell range; and monitor the target downlink channel according to the control signal, wherein the control signal is a sleep signal, and the sleep signal is used to make the target cell fall back from an activated BandWidth Part to a default BandWidth Part or an initial BandWidth Part, where a bandwidth of the default BandWidth Part or the initial BandWidth Part is smaller than that of other BandWidth Parts, wherein the one or more processors are configured to monitor the target downlink channel according to the control signal comprises that the one or more processors are configured to:
    stop monitoring the activated BandWidth Part of the target cell, and monitor the default BandWidth Part or the initial BandWidth Part of the target cell,
    wherein the one or more processors are configured to:
    acquire a first index identifier carried by the control signal, wherein an amount of data of the first index identifier is less than an amount of data of the target cell range,
    query a first index table according to the first index identifier; and
    acquire a target cell range corresponding to the first index identifier.

13. A device comprising:
    one or more processor; and
    a non-transitory computer-readable storage medium for storing instructions executable by the one or more processors,
    wherein the one or more processors are configured to execute the method for downlink channel monitoring according to claim 8.

* * * * *